Patented Sept. 2, 1952

2,609,270

UNITED STATES PATENT OFFICE 2,609,270

MILDEWPROOF CELLULOSE PRODUCED BY REACTION WITH CHLORO-BENZYL QUATERNARY AMMONIUM SALTS

Monroe Couper, Waynesboro, Va., assignor to Institute of Textile Technology, Charlottesville, Va., a corporation of Virginia No Drawing. Application November 15, 1949, Serial No. 127,527

6 Claims. (Cl. 8—116.2)

This invention relates to an improved method of mildewproofing cellulose, and to an improved mildewproof cellulosic product. The invention is based upon my discovery of certain quaternary ammonium compounds for treating cellulose (e. g. cotton, linen or regenerated cellulose) according to my invention to form a cellulosic product which is highly resistant to mildew-causing organisms. My invention provides an improved method of treating cellulose with such compounds with notable improvements in mildewproofing efficiency and in the mildewproof character of the resulting cellulose.

More particularly my invention is concerned with the treatment of cellulose with compounds having the formula

[structure: benzene ring with $(R)_n$ substituents and $-CH_2N^+\begin{smallmatrix}CH-CH\\ \\CH=CH\end{smallmatrix}CH \cdot X^-$ (pyridinium)]

where R represents chlorine or bromine, n is an integer from 1 to 5 inclusive, and X is a negative ion such as chloride, bromide, iodide or methosulfate ($CH_3SO_4^-$). These compounds are crystalline, solid, water-soluble quaternary nitrogen salts and have the capacity of attaching to or combining with the cellulose when applied in an aqueous solution or in an aqueous alkaline solution to impart to the cellulose a relatively stable mildewproof character. The compounds are at least tenaciously attached in whole or in part to the cellulose and I believe they form new compounds with the cellulose. When the chlorine substituted compound, for example, is incorporated with the cellulose, the compound which I believe results is a chlorobenzyl ether of cellulose. The class of compounds which I believe to form in the practice of my invention may be represented by the formula

[structure: benzene ring with $(R)_n$ and $-CH_2-O-$Cellulose]

in which $(R)_n$ is as above described. I attribute the tenacious coupling of the mildewproofing compounds to the cellulose to the formation of such compounds.

The mildewproofing compounds which I add to or combine with cellulose may be prepared by reacting the appropriate benzyl halide with pyridine. For example, N-(3,4-dichlorobenzyl) pyridinium chloride

[structure: 3,4-dichlorobenzyl pyridinium chloride]

is prepared by allowing 3,4-dichlorobenzyl chloride to stand overnight at 25° C. with 3 parts by weight of pyridine, and then filtering off the colorless crystals which have been formed. This compound is water-soluble and contains one atom of ionizable chlorine. In a similar way the tri-, tetra- or pentachloro, or tri-, tetra- or pentabromo derivatives may be prepared.

In carrying out a method of my invention in the preparation of a mildewproof cellulose, cellulose in any suitable form may be treated with one of the mildewproofing compounds in amounts varying, say, from 1% to 6%, based on the dry weight of the cellulose. The compound may be applied to the cellulose by impregnating the fabric, yarn, or fibrous mass, as the case may be, in an aqueous solution, removing the cellulose from the solution, and afterwards drying it at temperatures below about 100° C. Instead of simply drying the cellulose in the atmosphere, it may be dried by heating and thereafter heated to a curing temperature. One of the important features of my invention is that I can achieve a more tenacious coupling of the compounds to the cellulose by heating the treated and dried cellulose to a temperature of from 100° C. to 200° C., preferably at a temperature of 145° C. for a short time, say, for about ½ minute to 15 minutes.

The process is generally assisted by the presence of alkaline materials which are advantageously included in the impregnating solution. These include weak inorganic bases, such as sodium carbonate, sodium bicarbonate, sodium acetate, borax, trisodiumphosphate, or organic bases such as triethanolamine and ethylenediamine. These alkaline substances generally cause a greater percentage of the active ingredient to be bonded to the cellulose than would otherwise be possible, and they also serve to protect the cellulosic textile from the harmful effect on tensile strength, probably incurred by evolution of acid during the heating or curing step. By providing a suitable alkaline solution, the loss in tensile strength can be kept below 10%.

In a particular typical operation according to my invention, a sample of cotton fabric of average breaking load of 84 pounds per inch is steeped thoroughly in a solution consisting of 2 parts of N-(3,4-dichlorobenzyl) pyridinium chloride, 10 parts of sodium carbonate, and 88 parts of water. Excess solution is then removed from the fabric by passing it through squeeze-rolls and then allowing it to dry at room temperature. The fabric is then placed in an oven at 145° C. for 10 minutes. The treated fabric exhibits a breaking load of 79 pounds per inch. In order to demonstrate the permanency of the mildewproof properties, the sample was washed well in hot soap solution and extracted twice with boiling benzene, after which it was found to be totally resistant to a 7-day exposure in contact with an agar culture of Chaetomium globosum at 35° C. This treated sample revealed no visible mildew growth under these conditions, whereas an untreated sample similarly exposed appeared heavily covered with mildew growth and was severely damaged. In the above operation, the sodium carbonate may be replaced by equivalent amounts of any of the aforementioned alkaline materials.

The improved cellulose of my invention does not suffer appreciable adverse effects. For example, it does not acquire such undesirable properties as stiffness, odors, undesirable hand, or appreciable strength loss. The mildewproof cellulose of my invention will resist washing with soap, rubbing, solvent extraction and other harmful agencies, and still manifest mildew resistant properties to a marked degree. A significant feature of the invention is that the cellulose can be treated with a water solution in a simple padding and curing operation.

I claim:

1. The method of mildewproofing cellulose which comprises immersing the cellulose in an aqueous solution containing from 1% to 6% of a compound represented by the formula

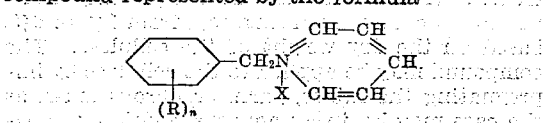

in which R represents a halogen of the group consisting of chlorine and bromine, $n$ is an integer from 1 to 5 inclusive, and X is a negative ion of the group consisting of chlorine, bromine, iodine and $(CH_3SO_4^-)$, drying the cellulose and heating the cellulose to a temperature in the range of from 100° C. to 200° C. to cure the product and tenaciously couple the compound to the cellulose.

2. The method of mildewproofing cellulose which comprises immersing the cellulose in an aqueous weakly alkaline solution containing from 1% to 6% of a compound represented by the formula

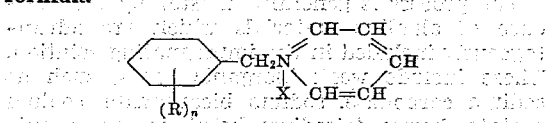

in which R represents a halogen of the group consisting of chlorine and bromine, $n$ is an integer from 1 to 5 inclusive, and X is a negative ion of the group consisting of chlorine, bromine, iodine and $(CH_3SO_4^-)$, drying the cellulose and heating the cellulose to a temperature in the range of from 100° C. to 200° C. to cure the product and tenaciously couple the compound to the cellulose.

3. The improved mildewproofed cellulosic product resulting from immersing cellulose in an aqueous solution of from 1% to 6% of a compound represented by the formula

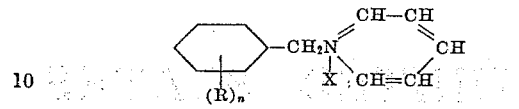

in which R represents a halogen of the group consisting of chlorine and bromine, $n$ is an integer from 1 to 5 inclusive, and X is a negative ion of the group consisting of chlorine, bromine, iodine and $(CH_3SO_4^-)$, drying the cellulose and heating the cellulose to a temperature in the range of from 100° C. to 200° C. to cure the product and tenaciously couple the compound to the cellulose.

4. The method of mildewproofing cellulose which comprises impregnating the cellulose with an aqueous solution containing from 1% to 6% of a compound represented by the formula

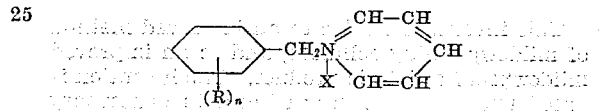

in which R represents a halogen of the group consisting of chlorine and bromine, $n$ is an integer from 1 to 5 inclusive, and X is a negative ion of the group consisting of chlorine, bromine, iodine and $(CH_3SO_4^-)$, drying the cellulose and heating the cellulose to a temperature in the range of from 100° C. to 200° C. to cure the product and tenaciously couple the compound to the cellulose.

5. The method of mildewproofing cellulose which comprises impregnating the cellulose with an aqueous weakly alkaline solution containing from 1% to 6% of a compound represented by the formula

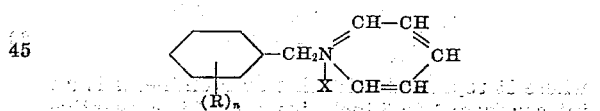

in which R represents a halogen of the group consisting of chlorine and bromine, $n$ is an integer from 1 to 5 inclusive, and X is a negative ion of the group consisting of chlorine, bromine, iodine and $(CH_3SO_4^-)$, drying the cellulose and heating the cellulose to a temperature in the range of from 100° C. to 200° C. to cure the product and tenaciously couple the compound to the cellulose.

6. The mildewproofed cellulosic product resulting from the process of claim 5.

MONROE COUPER.

REFERENCES CITED

The following references are of record in the file of this patent:

UNITED STATES PATENTS

| Number | Name | Date |
|---|---|---|
| 2,090,890 | Howard et al. | Aug. 24, 1937 |
| 2,160,176 | Shipp | May 30, 1939 |

OTHER REFERENCES

Journal American Pharmaceutical Association, volume 36, November 1947, pages 353 to 358. "Germicidal Action of Some Benzyl Quaternary Ammonium Compounds Having Substituents in the Aromatic Nucleus," Lawrence et al.